United States Patent
Calvano

(10) Patent No.: US 11,734,161 B2
(45) Date of Patent: Aug. 22, 2023

(54) SYSTEM AND METHOD FOR FUZZING TEST ORCHESTRATION USING REINFORCEMENT LEARNING

(71) Applicant: Raytheon Company, Waltham, MA (US)

(72) Inventor: Andrew R. Calvano, Draper, UT (US)

(73) Assignee: Raytheon Company, Waltham, MA (US)

( * ) Notice: Subject to any disclaimer, the term of this patent is extended or adjusted under 35 U.S.C. 154(b) by 737 days.

(21) Appl. No.: 16/779,365

(22) Filed: Jan. 31, 2020

(65) Prior Publication Data

US 2021/0240601 A1   Aug. 5, 2021

(51) Int. Cl.
  *G06F 11/36* (2006.01)
  *G06N 20/00* (2019.01)

(52) U.S. Cl.
  CPC ...... *G06F 11/3688* (2013.01); *G06F 11/3692* (2013.01); *G06N 20/00* (2019.01)

(58) Field of Classification Search
  CPC ............... G06F 11/3688–3692; G06N 20/00
  See application file for complete search history.

(56) References Cited

U.S. PATENT DOCUMENTS

| | | | | |
|---|---|---|---|---|
| 10,635,576 B2 * | 4/2020 | Phan | ................ | G06F 11/3688 |
| 2019/0361789 A1 * | 11/2019 | Phan | ................ | G06F 11/3676 |
| 2021/0011837 A1 * | 1/2021 | Coppa | ................ | G06F 11/3684 |
| 2021/0141715 A1 * | 5/2021 | Lin | ................ | G06N 20/00 |
| 2022/0156168 A1 * | 5/2022 | Panikkar | ................ | G06F 11/277 |

OTHER PUBLICATIONS

Dhillon et al., "Reinforcement Learning for Fuzzing Testing Techniques", Retrieved online [http://www.tdcommons.org/dpubs_series/892 on Aug. 2, 2022], pp. 1-36 (Year: 2017).*
Spieker et al., "Reinforcement Learning for Automatic Test Case Prioritization and Selection in Continuous Integration", published by ACM, ISSTA'17, Jul. 2017, Santa Barbara, CA, USA, pp. 12-22 (Year: 2017).*
Patra et al., "Learning to Fuzz: Application-Independent Fuzz Testing with Probabilistic, Generative Models of Input Data", published by Technical Report TUD-CS-2016-14664, TU Darmstadt, Department of Computer Science, pp. 1-14 (Year: 2016).*

(Continued)

*Primary Examiner* — S. Sough
*Assistant Examiner* — Zheng Wei

(57) ABSTRACT

A method includes selecting a fuzzer for execution by each of multiple fuzzing clients during a first time interval of a fuzzing test of computer software code. The method also includes selecting a feedback type for statistics to be reported by the fuzzing clients at an end of the first time interval of the fuzzing test. The method also includes providing an identification of the fuzzer and the feedback type to each of the fuzzing clients. The method also includes obtaining the statistics at the end of the first time interval of the fuzzing test. The method also includes determining one or more rewards based on the statistics. The method also includes adjusting multiple weights in multiple stochastic policies based on the one or more rewards, wherein the weights are used to determine the fuzzer and the feedback type in a subsequent interval of the fuzzing test.

20 Claims, 6 Drawing Sheets

(56) References Cited

OTHER PUBLICATIONS

Lyu et al., "MOPT: Optimized Mutation Scheduling for Fuzzers", published by 28th USENIX Security Symposium, USENIX Association, pp. 1949-1966 (Year: 2019).*
Bottinger, et al., "Deep Reinforcement Fuzzing," 2018 IEEE Security and Privacy Workshops, 7 pages.
Chen, et al., "EnFuzz: Ensemble Fuzzing with Seed Synchronization among Diverse Fuzzers," USENIX Security Symposium (2018), 17 pages.

* cited by examiner

SYSTEM AND METHOD FOR FUZZING TEST ORCHESTRATION USING REINFORCEMENT LEARNING

TECHNICAL FIELD

This disclosure is generally directed to machine learning systems. More specifically, this disclosure is directed to a system and method for fuzzing test orchestration using reinforcement learning.

BACKGROUND

Fuzzing is a widely used process for detecting security vulnerabilities in computer software code by repeatedly testing the code with modified (i.e., fuzzed) inputs. There are various types of fuzzers that perform fuzzing tests with different fuzzing strategies. For example, some fuzzing tests implement a "dumb" fuzzer that simply corrupts random bits. Other fuzzing tests implement a "mutation" fuzzer that uses data flow information to tweak or "mutate" input bytes. Fuzzing tests have many parameters that, when tweaked, cause vastly different behavior in fuzzer performance. Most conventional fuzzers only use a single feedback type, such as code coverage data, to drive progress.

SUMMARY

This disclosure relates to a system and method for fuzzing test orchestration using reinforcement learning.

In a first embodiment, a method includes selecting a fuzzer for execution by each of multiple fuzzing clients during a first time interval of a fuzzing test of computer software code. The method also includes selecting a feedback type for statistics to be reported by the fuzzing clients at an end of the first time interval of the fuzzing test. The method also includes providing an identification of the fuzzer and the feedback type to each of the fuzzing clients. The method also includes obtaining the statistics at the end of the first time interval of the fuzzing test. The method also includes determining one or more rewards based on the statistics. The method also includes adjusting multiple weights in multiple stochastic policies based on the one or more rewards, wherein the weights are used to determine the fuzzer and the feedback type in a subsequent interval of the fuzzing test.

In a second embodiment, a system includes at least one memory configured to store instructions and at least one processor coupled to the at least one memory. The at least one processor is configured when executing the instructions to select a fuzzer for execution by each of multiple fuzzing clients during a first time interval of a fuzzing test of computer software code; select a feedback type for statistics to be reported by the fuzzing clients at an end of the first time interval of the fuzzing test; provide an identification of the fuzzer and the feedback type to each of the fuzzing clients; obtain the statistics at the end of the first time interval of the fuzzing test; determine one or more rewards based on the statistics; and adjust multiple weights in multiple stochastic policies based on the one or more rewards, wherein the weights are used to determine the fuzzer and the feedback type in a subsequent interval of the fuzzing test.

In a third embodiment, a non-transitory computer readable medium contains instructions that when executed cause at least one processor to select a fuzzer for execution by each of multiple fuzzing clients during a first time interval of a fuzzing test of computer software code; select a feedback type for statistics to be reported by the fuzzing clients at an end of the first time interval of the fuzzing test; provide an identification of the fuzzer and the feedback type to each of the fuzzing clients; obtain the statistics at the end of the first time interval of the fuzzing test; determine one or more rewards based on the statistics; and adjust multiple weights in multiple stochastic policies based on the one or more rewards, wherein the weights are used to determine the fuzzer and the feedback type in a subsequent interval of the fuzzing test.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, fuzzing is widely used for detecting security vulnerabilities in computer software code. Various types of fuzzers exist that perform fuzzing tests with different fuzzing strategies. Examples include "dumb" fuzzers and "mutation" fuzzers. Most conventional fuzzers only use a single feedback type, such as code coverage data, to drive progress. However, there is evidence that fuzzing is more effective when the fuzzing test uses multiple feedback types. In addition, results can be improved when multiple fuzzers are implemented in parallel. A solution is needed to intelligently learn optimal parameter selection with respect to fuzzing rewards during test orchestration.

Most test orchestration methods do not intelligently schedule or optimize parameter values. Rather, they implement simple scaffolding, such as test deployment, and manage a single feedback source to guide fuzzing. Additionally, they use a single fuzzer and do not support the use of multiple fuzzers during a test. While proposals exist for making use of multiple fuzzers, such proposals do not include intelligent scheduling of such fuzzers. Instead, each fuzzer operates in isolation.

This disclosure provides systems and methods for fuzzing test orchestration using reinforcement learning. As described in more detail below, the disclosed systems and methods frame the issue of fuzzing test orchestration as a reinforcement learning problem. As known in the art, reinforcement learning is a type of machine learning in which software agents learn how to take actions in an environment in order to maximize a reward. In the disclosed embodiments, a centralized orchestration agent responsible for test decision-making determines one or more actions that the agent can perform to change the strategy of a fuzzing test. Each decision that the agent makes may have a positive or negative effect on the overall fuzzing test performance. Using reinforcement learning techniques, the agent learns the decisions that optimize fuzzer performance.

Figure 1:
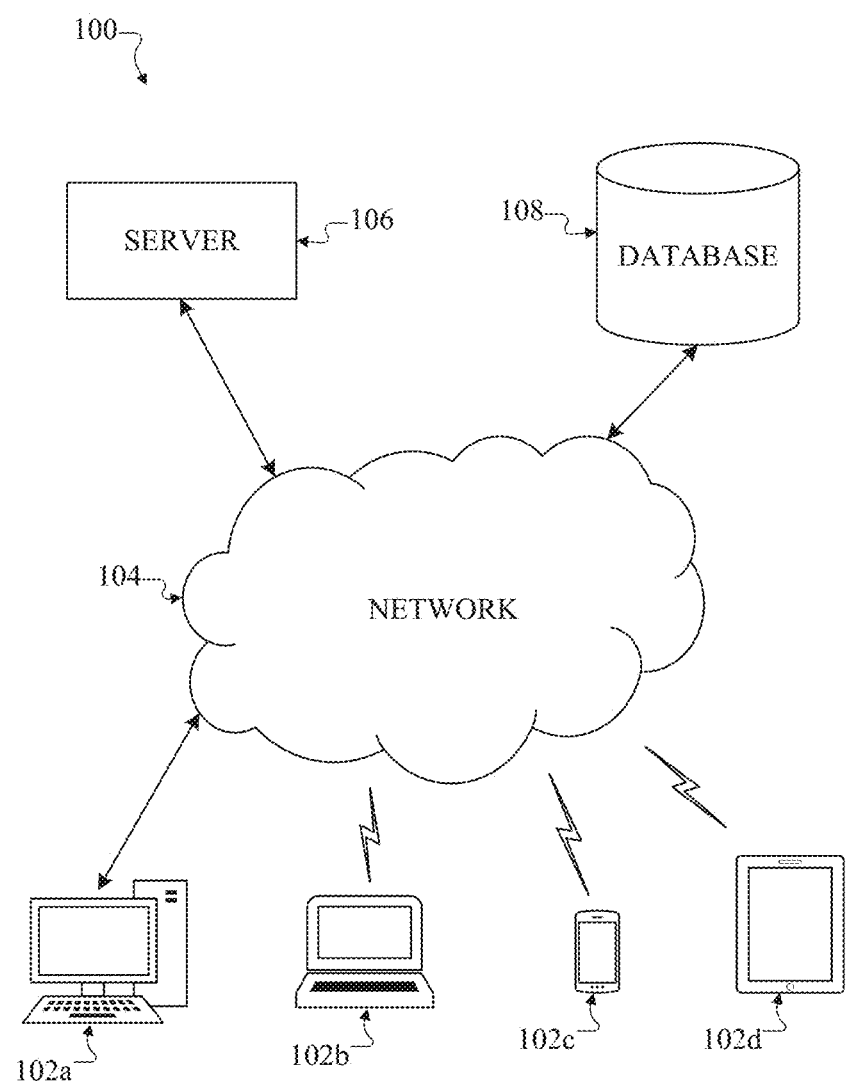
FIG. 1 illustrates an example system for fuzzing test orchestration using reinforcement learning according to this disclosure.

FIG. 1 illustrates an example system 100 for fuzzing test orchestration using reinforcement learning according to this disclosure. As shown in FIG. 1, the system 100 includes multiple user devices 102a-102d, at least one network 104, at least one server 106, and at least one database 108. Note, however, that other combinations and arrangements of components may also be used here.

In this example, each user device 102a-102d is coupled to or communicates over the network 104. Communications between each user device 102a-102d and a network 104 may occur in any suitable manner, such as via a wired or wireless connection. Each user device 102a-102d represents any suitable device or system used by at least one user to provide information to the server 106 or database 108 or to receive information from the server 106 or database 108. Example types of information may include types of fuzzers, feedback types, stochastic policy information, fuzzing client actions, fuzzing test statistics, and the like.

Any suitable number(s) and type(s) of user devices 102a-102d may be used in the system 100. In this particular example, the user device 102a represents a desktop computer, the user device 102b represents a laptop computer, the user device 102c represents a smartphone, and the user device 102d represents a tablet computer. However, any other or additional types of user devices may be used in the system 100. Each user device 102a-102d includes any suitable structure configured to transmit and/or receive information.

The network 104 facilitates communication between various components of the system 100. For example, the network 104 may communicate Internet Protocol (IP) packets, frame relay frames, Asynchronous Transfer Mode (ATM) cells, or other suitable information between network addresses. The network 104 may include one or more local area networks (LANs), metropolitan area networks (MANs), wide area networks (WANs), all or a portion of a global network such as the Internet, or any other communication system or systems at one or more locations. The network 104 may also operate according to any appropriate communication protocol or protocols.

The server 106 is coupled to the network 104 and is coupled to or otherwise communicates with the database 108. The server 106 supports the retrieval of information from the database 108 and the processing of that information. Of course, the database 108 may also be used within the server 106 to store information, in which case the server 106 may store the information itself.

Among other things, the server 106 processes information for orchestrating fuzzing tests using reinforcement learning. The server 106 includes any suitable structure configured to process for orchestrating fuzzing tests using reinforcement learning. In some embodiments, the server 106 includes one or more processors, one or more memories, and one or more communication interfaces. Note, however, that the server 106 may be implemented in any suitable manner to perform the described functions. Also note that while described as a server here, the device(s) actually implementing the server 106 may represent one or more desktop computers, laptop computers, server computers, or other computing or data processing devices or systems.

The database 108 stores various information used, generated, or collected by the server 106 and the user devices 102a-102d. For example, the database 108 may store fuzzing test statistics generated before, during, or after one or more iterations of a fuzzing test.

There are a number of possible ways to implement the system 100 in order to provide the described functionality for orchestrating fuzzing tests using reinforcement learning. For example, in some embodiments, the server 106 and database 108 are owned, operated, or managed by a common entity. In other embodiments, the server 106 and database 108 are owned, operated, or managed by different entities. Note, however, that this disclosure is not limited to any particular organizational implementation.

Although FIG. 1 illustrates one example of a system 100 for fuzzing test orchestration using reinforcement learning, various changes may be made to FIG. 1. For example, the system 100 may include any number of user devices 102a-102d, networks 104, servers 106, and databases 108. Also, while FIG. 1 illustrates that one database 108 is coupled to the network 104, any number of databases 108 may reside at any location or locations accessible by the server 106, and each database 108 may be coupled directly or indirectly to the server 106. In addition, while FIG. 1 illustrates one example operational environment in which fuzzing tests can be orchestrated using reinforcement learning, this functionality may be used in any other suitable system.

Figure 2:
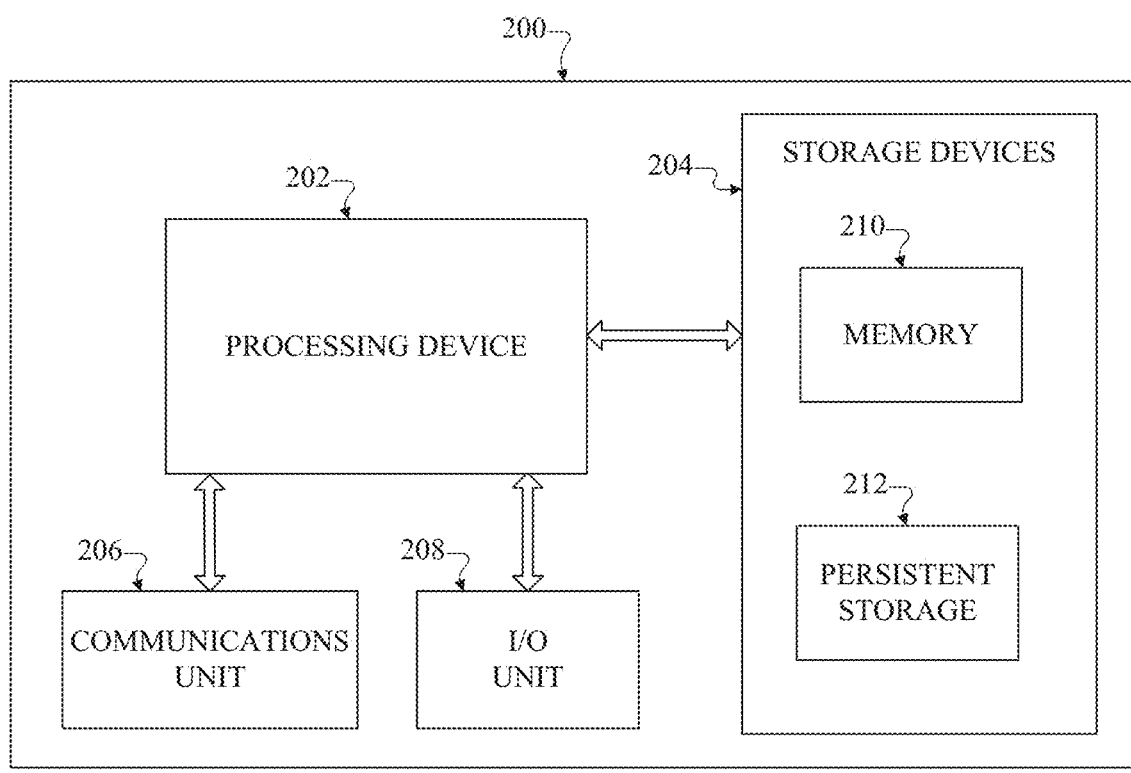
FIG. 2 illustrates an example device for fuzzing test orchestration using reinforcement learning according to this disclosure.

FIG. 2 illustrates an example device 200 for fuzzing test orchestration using reinforcement learning according to this disclosure. One or more instances of the device 200 may, for example, be used to at least partially implement the functionality of the server 106 of FIG. 1. However, the functionality of the server 106 may be implemented in any other suitable manner. Also, the same or similar arrangement of components may be used to at least partially implement the functionality of one or more of the user devices 102a-102d in FIG. 1. However, the functionality of each user device 102a-102d may be implemented in any other suitable manner.

As shown in FIG. 2, the device 200 denotes a computing device or system that includes at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include a network interface card or a wireless transceiver facilitating communications over a wired or wireless network, such as the network 104. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the I/O unit 208 may be omitted if the device 200 does not require local I/O, such as when the device 200 can be accessed remotely.

In some embodiments, the instructions executed by the processing device 202 can include instructions that implement the functionality of the server 106 described above. For example, the instructions executed by the processing device 202 can include instructions for orchestrating fuzzing tests using reinforcement learning.

Although FIG. 2 illustrates one example of a device 200 for fuzzing test orchestration using reinforcement learning, various changes may be made to FIG. 2. For example, computing devices and systems come in a wide variety of configurations, and FIG. 2 does not limit this disclosure to any particular computing device or system.

Figure 3:
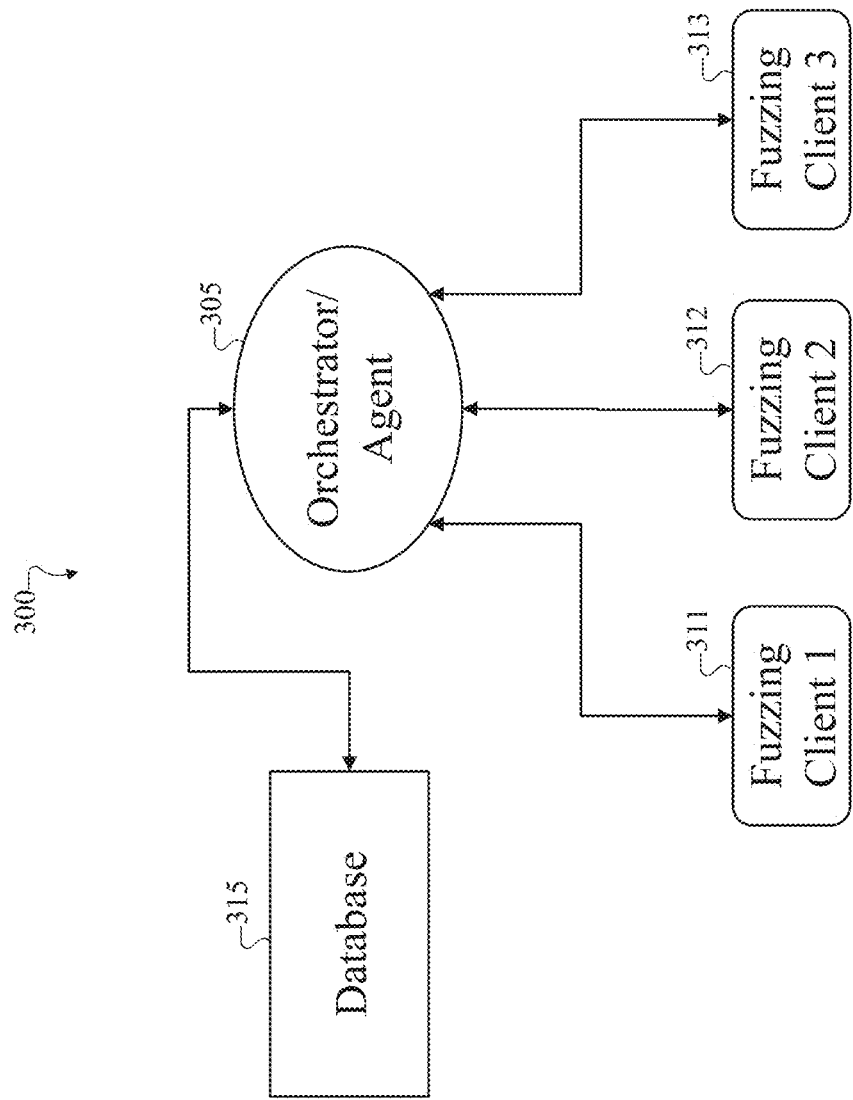
FIG. 3 illustrates an example architecture for fuzzing test orchestration using reinforcement learning according to this disclosure.

FIG. 3 illustrates an example architecture 300 for fuzzing test orchestration using reinforcement learning according to this disclosure. For ease of explanation, the architecture 300 is described as being implemented using one or more components of the system 100 shown in FIG. 1. However, the architecture 300 could be implemented in any other suitable system.

As shown in FIG. 3, the architecture 300 includes an orchestrator/agent (hereinafter referred to simply as "agent") 305, multiple fuzzing clients 311-313, and a database 315.

The agent 305 operates to orchestrate fuzzing test strategy and manage the operation of the fuzzing clients 311-313 based on the fuzzing test strategy. The agent 305 uses reinforcement learning techniques to control fuzzing test strategy decision-making. During the course of the fuzzing test, a time interval elapses, at which point the agent 305 makes one or more decisions about how the fuzzing test should proceed. During the decision-making process, the agent 305 examines the state of the fuzzing test in order to inform the decisions. The state of the fuzzing test includes information for each supported feedback type (e.g., basic block node coverage, edge coverage, branch taken/not taken coverage, the number of tests executed, the number of observed errors or exceptions during execution, the average length of a test, any dataflow information generated, and the like). Based on the state of the fuzzing test, the agent 305 tweaks one or more parameters positively or negatively based on reward status across each time interval. The agent 305 performs these operations for every time interval of the fuzzing test. Over the course of the fuzzing test, the agent 305 learns what is most effective in terms of the reward on a specific target.

The fuzzing clients 311-313 execute the fuzzers, in accordance with instructions from the agent 305, in order to perform the fuzzing test. Each fuzzing client 311-313 receives instruction information (referred to as "actions") from the agent 305 to guide execution of the fuzzers during the fuzzing test. In some embodiments, the instruction information from the agent 305 includes the type of fuzzer to execute. Multiple types of fuzzers exist, including random data generators (that generate random bytes or strings of data), data mutators (that take existing input data and mutate or corrupt the data by changing values, bytes, or strings), and generational fuzzers (that generate fuzzing data from scratch). During and after each time interval of the fuzzing test, each fuzzing client 311-313 sends reward feedback information to the agent 305.

Each fuzzing client 311-313 includes any suitable hardware, software, firmware, or a combination of these, that is capable of executing fuzzers to perform fuzzing tests. In some embodiments, each fuzzing client 311-313 may represent (or be represented by) the server 106 or one of the user devices 102a-102d. In some embodiments, each fuzzing client 311-313 is implemented in a separate device. In other embodiments, two or more of the fuzzing clients 311-313 may be implemented in one device. In some embodiments, one or more of the fuzzing clients 311-313 may be implemented in the same device that implements the agent 305. While FIG. 3 illustrates the architecture 300 with three fuzzing clients 311-313, this is merely one example. In other embodiments, there may be greater or fewer than three fuzzing clients.

The database 315 is communicatively coupled to the agent 305 and can provide data to, or store data from, the agent 305. In particular, the database 315 stores fuzzing test statistics generated before, during, or after each time interval of the fuzzing test. The database 315 includes any suitable storage for storing fuzzing test statistics. In some embodiments, the database 315 may represent (or be represented by) the database 108 of FIG. 1.

In one aspect of operation, the goal of the agent 305 is to optimize performance of the fuzzing test. Here, optimization is determined with respect to fuzzing results. For example, the reward could be measured with respect to new coverage obtained given one or more feedback types, the number of crashes observed in a given time interval, triggers of certain behavior, number of tests, average test time, and the like. In a fuzzing test, there are many possible feedback types, including execution time of the application, the code coverage that was triggered, the number of system calls that were made, and the like. These feedback types represent different parameters or statistics that can characterize a fuzzing test.

In the architecture 300, there are multiple parameters that can be changed. For example, the architecture 300 supports the execution of multiple types of fuzzers at one time on the same target. Thus, the probability rates of each fuzzing client 311-313 selecting one fuzzer over another is a parameter that can be updated based on test progress. Additionally, the architecture 300 supports multiple feedback types and can update the use of each in the same way. It has been observed that a simple feedback type may plateau much faster than a more complex feedback type. Based on this observation, the agent 305 can learn to select feedback types that are not in a state of stagnation. Similarly, scheduling certain types of analysis jobs, such as dataflow analysis or SMT solving, may be very expensive. In fuzzing tests that use such types of jobs, the agent 305 can learn whether or not these tasks will prove beneficial based on the current model of the environment. For example, the task may prove beneficial if all feedback types have plateaued. In contrast, the task may prove negative if there is still one or more feedback types making progress in terms of new coverage.

Although FIG. 3 illustrates one example of an architecture for fuzzing test orchestration using reinforcement learning, various changes may be made to FIG. 3. For example, the number of agents, fuzzing clients, or databases, and the manner in which these components are arranged and connected, may be different than what is shown in FIG. 3. In general, system architectures come in a wide variety of configurations, and FIG. 3 does not limit this disclosure to any particular arrangement of components.

Figure 4A:
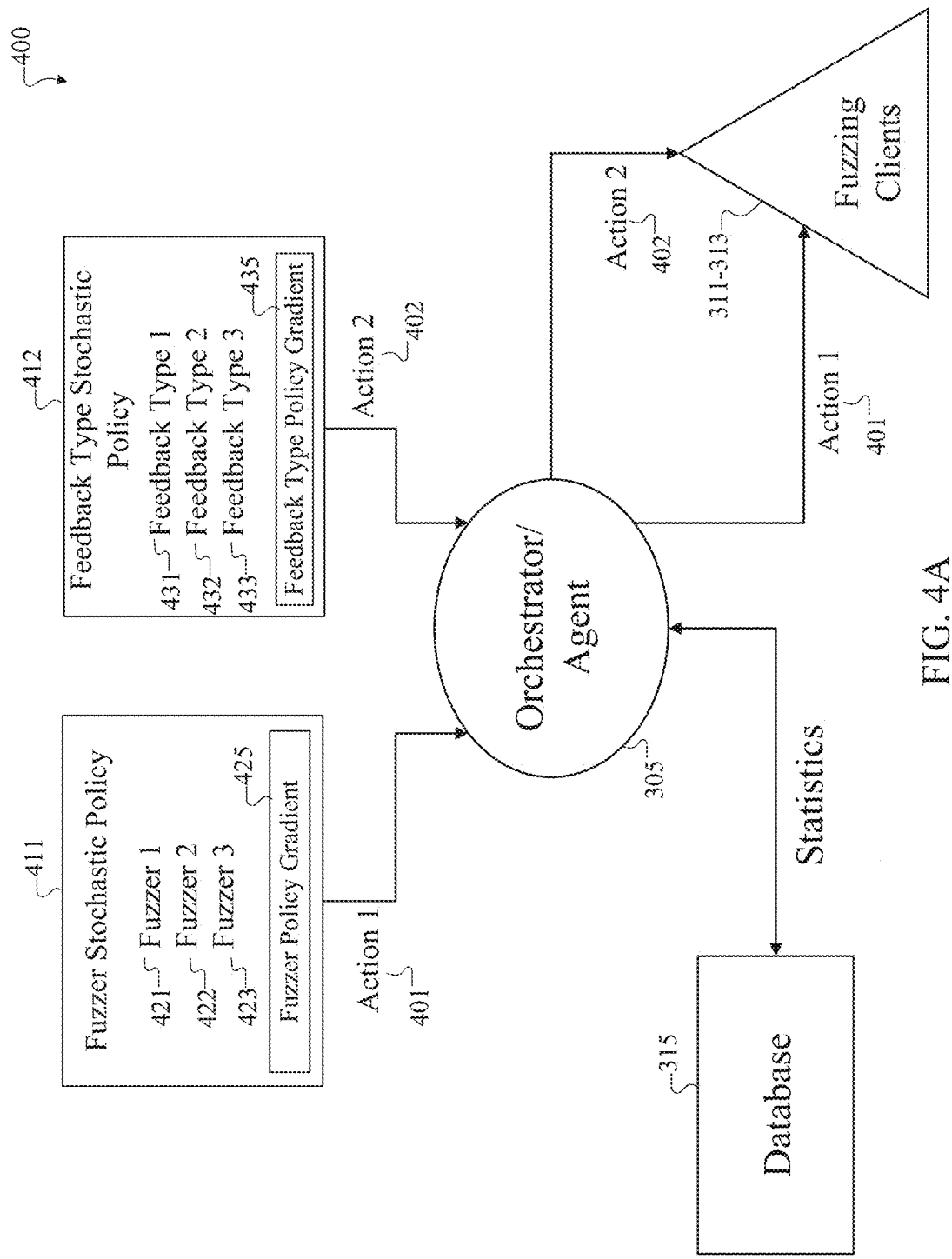
FIGS. 4A and 4B illustrate an example process for orchestrating fuzzing tests using reinforcement learning according to this disclosure.
Figure 4B:
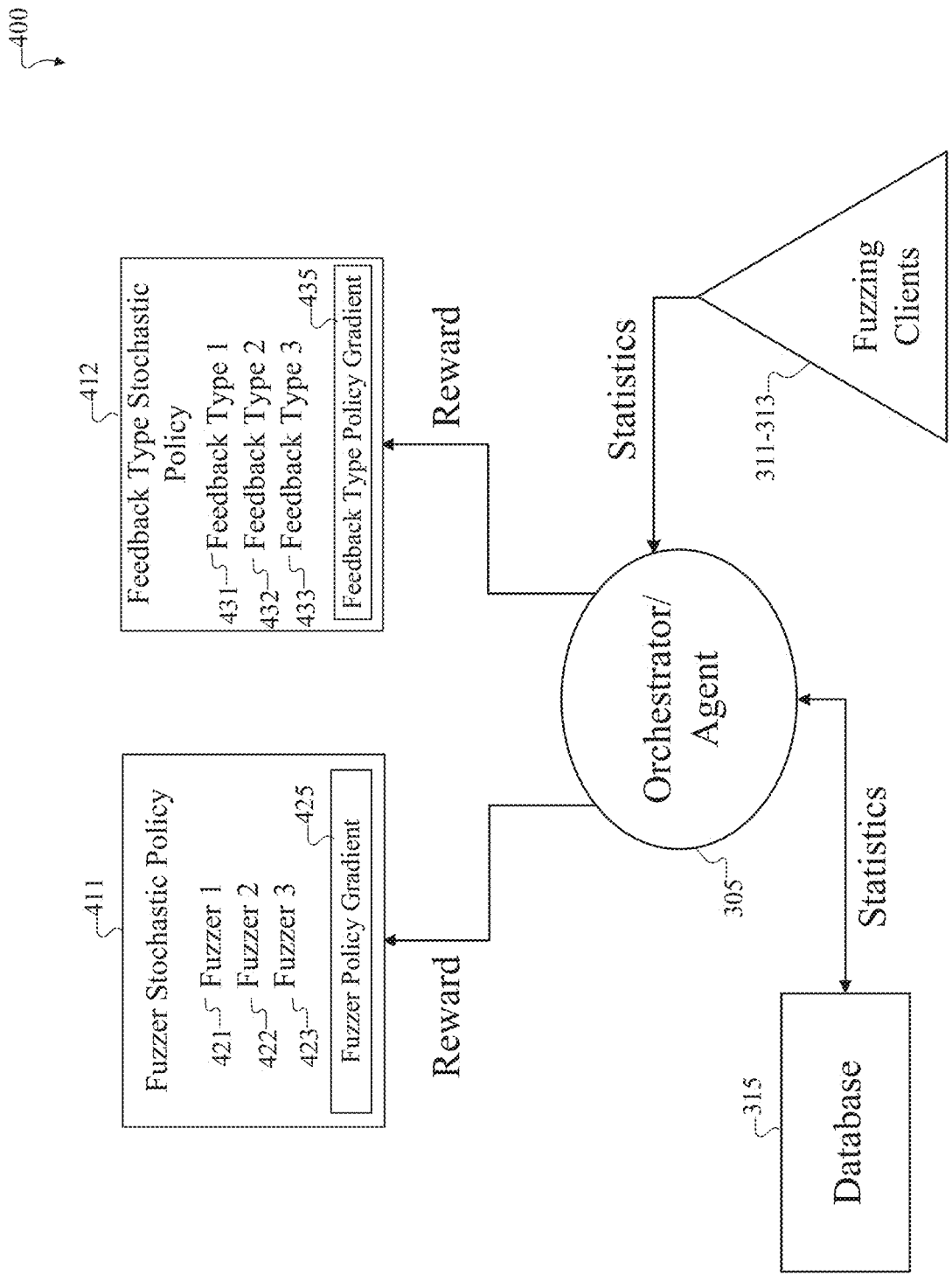

FIGS. 4A and 4B illustrate an example process 400 for orchestrating fuzzing tests using reinforcement learning according to this disclosure. For ease of explanation, the process 400 is described as being implemented using the architecture 300 shown in FIG. 3. However, the process 400 could be implemented using any other suitable system.

As shown in FIGS. 4A and 4B, the process 400 is performed in multiple time intervals that occur in sequence. During each time interval, the agent 305 coordinates with the fuzzing clients 311-313 to perform a portion of the fuzzing test, the fuzzing clients 311-313 perform the portion of the fuzzing test and provide feedback to the agent 305, and the agent 305 determines rewards that affect the testing during the next time interval. FIG. 4A illustrates a process for agent decision making at the beginning of a time interval, and FIG. 4B illustrates a process for reward determination and feedback at the end of a time interval.

As shown in FIG. 4A, the agent 305 performs two actions 401 and 402. The action 401 ("Action 1") comprises selection of a fuzzer to be used in a current time interval, and the action 402 ("Action 2") comprises selection of a feedback type for feedback after the current time interval. Once the fuzzer and feedback type are selected, the agent 305 informs the fuzzing clients 311-313 of the selected fuzzer and feedback type, so that the fuzzing clients 311-313 can perform the fuzzing test using the selected fuzzer and provide the selected type of feedback to the agent 305.

The agent 305 performs the actions 401-402 based on information in multiple stochastic policies 411-412, where each stochastic policy 411-412 is associated with one of the actions 401-402. That is, the fuzzer stochastic policy 411 is associated with the action 401 (e.g., selection of a fuzzer) and the feedback type stochastic policy 412 is associated with the action 402 (e.g., selection of a feedback type).

The fuzzer stochastic policy 411 includes multiple fuzzers 421-423 and a corresponding probability that determines the weight for each fuzzer 421-423. In this example, the fuzzer 421 is a random data generator, the fuzzer 422 is a data mutator, and the fuzzer 423 is a generational fuzzer. Of course, this is merely one example; in other embodiments, the number of fuzzers could be greater or fewer than three, and the specific fuzzers could be different that those described here.

The feedback type stochastic policy 412 includes multiple feedback types 431-433 and a corresponding probability that determines the weight for each feedback type 431-433. In this example, the feedback type 431 is node coverage, the feedback type 432 is edge coverage, and the feedback type 433 is average test time. Of course, this is merely one example; in other embodiments, the number of feedback types could be greater or fewer than three, and the specific feedback types could be different that those described here. For the first time interval, both stochastic policies 411-412 are initialized with random weights. That is, the probabilities associated with each fuzzer 421-423 are initially set to random values, and the probabilities associated with each feedback type 431-433 are initially set to random values.

At the start of the first time interval, the agent 305 performs the action 401 by selecting the fuzzer 421-423 from the fuzzer stochastic policy 411 that has the highest probability value (i.e., the largest weight value). For the sake of this example, it is assumed that the agent 305 selects the data mutator fuzzer 422 from the fuzzer stochastic policy 411. The agent 305 also performs the action 402 by selecting the feedback type 431-433 from the feedback type stochastic policy 412 that has the highest probability value. For the sake of this example, it is assumed that the agent 305 selects the node coverage feedback type 431 from the feedback type stochastic policy 412.

After selecting the data mutator fuzzer 422 and the node coverage feedback type 431, the agent 305 communicates the selections to the fuzzing clients 311-313. In some embodiments, the agent 305 provides the data mutator fuzzer 422 and the node coverage feedback type 431 to the fuzzing clients 311-313, or provides identifiers representing the data mutator fuzzer 422 and the node coverage feedback type 431 to the fuzzing clients 311-313. Once the fuzzing clients 311-313 know what fuzzer and feedback type to use, the fuzzing clients 311-313 perform the fuzzing test during the first time interval using the data mutator fuzzer 422. The fuzzing clients 311-313 collect statistics associated with the fuzzing test, which are stored in the database 315, as shown in FIG. 4B. For example, since the selected feedback type is the node coverage feedback type 431, the fuzzing clients 311-313 collect statistics on node coverage during the fuzzing test.

Once the first time interval ends, the agent 305 polls the database 315 for the statistics. For example, from the statistics, the agent 305 may learn that node coverage has, e.g., increased by 1500 nodes and that no crashes (i.e., no software faults) have been encountered during the fuzzing test. Using the statistics, the agent 305 computes rewards and propagates the rewards to the policy gradients 425, 435. By propagating the rewards to the policy gradients 425, 435, the agent 305 updates one or more of the weights associated with the fuzzers 421-423 and the feedback types 431-433 in the respective stochastic policies 411-412.

At the end of the first time interval, the agent 305 determines whether the fuzzing test is to be continued in a second time interval. This determination can be based on user input, a predetermined threshold number of time intervals, or any other suitable method. Assuming that the fuzzing test is to be continued, the second time interval begins.

At the start of the second time interval, the agent 305 selects the fuzzer 421-423 from the fuzzer stochastic policy 411 that has the highest probability value (i.e., the largest weight value), and selects the feedback type 431-433 from the feedback type stochastic policy 412 that has the highest probability value. For the sake of this example, it is assumed that the updated weights from the first time interval cause the agent 305 to select the generational fuzzer 423 and select the edge coverage feedback type 432.

After selecting the generational fuzzer 423 and the edge coverage feedback type 432, the agent 305 communicates the selections to the fuzzing clients 311-313. The fuzzing clients 311-313 then perform the fuzzing test during the second time interval using the generational fuzzer 423. The fuzzing clients 311-313 collect statistics on edge coverage during the fuzzing test.

Once the second time interval ends, the agent 305 polls the database 315 for the statistics. For example, from the statistics, the agent 305 may learn that edge coverage has, e.g., increased by 3000 edges and that no crashes have been encountered during the fuzzing test. Using the statistics, the agent 305 computes rewards and propagates the rewards to the policy gradients 425, 435, which updates the weights in the respective stochastic policies 411-412.

At the end of the second time interval, the agent 305 determines whether the fuzzing test is to be continued in a third time interval. If so, the agent 305 selects a fuzzer 421-423 and a feedback type 431-433, reports these to the fuzzing clients 311-313, and the fuzzing clients 311-313 perform the fuzzing test in the third time interval. The agent 305 then uses the collected statistics to compute the rewards and propagates the rewards to the policy gradients 425, 435, which updates the weights in the respective stochastic policies 411-412. This process repeats until it is determined that the fuzzing test is concluded.

Over time, using reinforcement learning, the agent 305 is able to learn which of the fuzzers 421-423 is most effective during the fuzzing test. The agent 305 is also able to learn which of the feedback types 431-433 is most effective. This information can be reported to a user (e.g., a system analyst or manager) for decision making. As discussed above, the process 400 is highly automated. A user simply needs to input multiple fuzzing clients, input the software code to be tested, and start execution of the fuzzing test. The agent 305 then automatically orchestrates and controls operation of the fuzzing clients 311-313 to perform the fuzzing test over multiple time intervals.

Although FIGS. 4A and 4B illustrate one example of a process for orchestrating fuzzing tests using reinforcement learning, various changes may be made to FIGS. 4A and 4B. For example, while two actions, two policy gradients, and two stochastic policies are shown, the number of actions, policy gradients, and stochastic policies could be greater or fewer than two. Also, various operations in FIGS. 4A and 4B may overlap, occur in parallel, occur in a different order, or occur any number of times.

Figure 5:
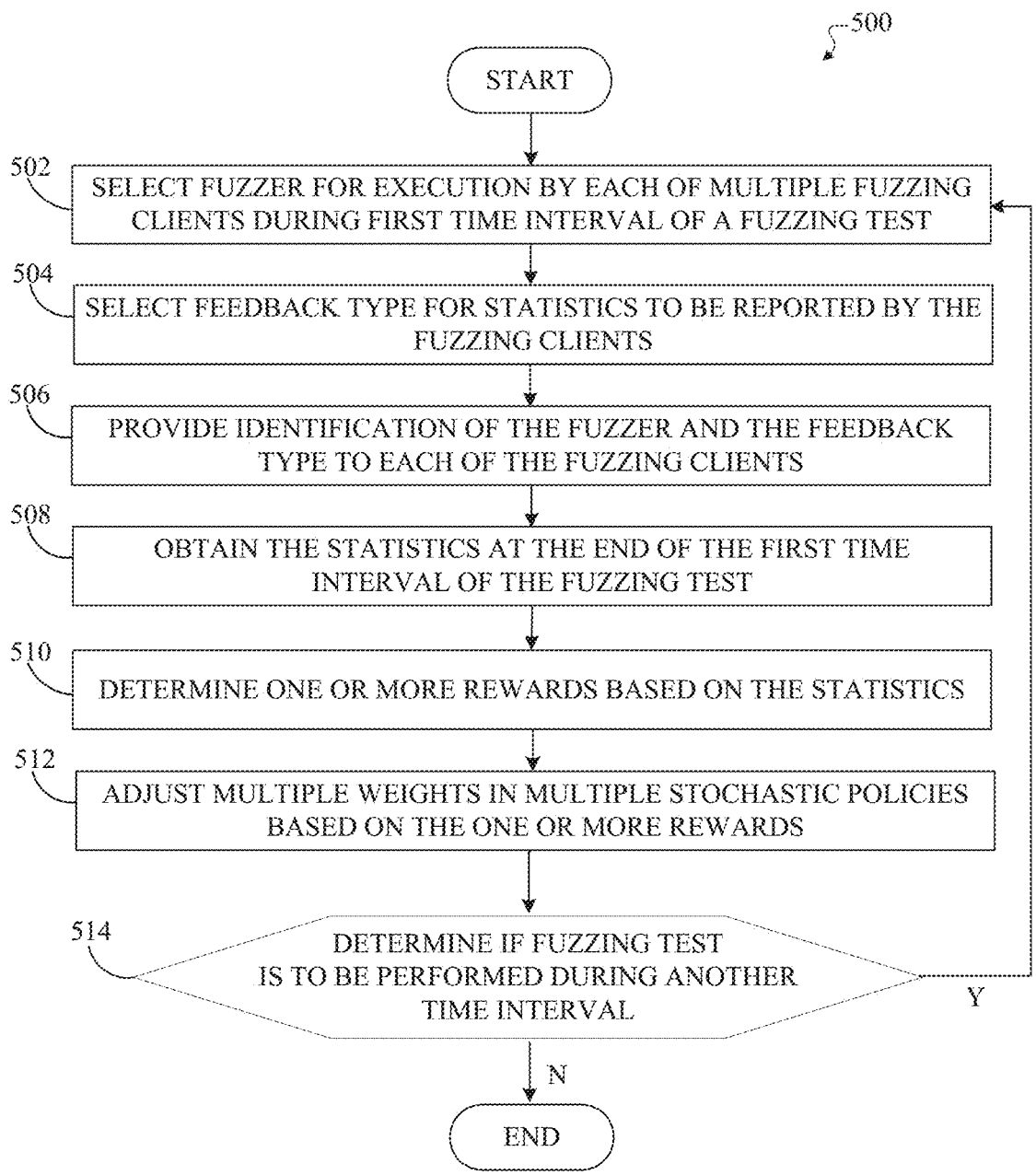
FIG. 5 illustrates an example method for fuzzing test orchestration using reinforcement learning according to this disclosure.

FIG. 5 illustrates an example method 500 for fuzzing test orchestration using reinforcement learning according to this disclosure. For ease of explanation, the method 500 of FIG. 5 may be described as being performed using the architecture 300 in FIG. 3, which may be implemented using one or more devices 200 of FIG. 2. However, the method 500 may involve the use of any suitable device(s) and architecture(s) in any suitable system(s).

As shown in FIG. 5, at step 502, a fuzzer is selected for execution by each of multiple fuzzing clients during a first time interval of a fuzzing test of computer software code. This may include, for example, the agent 305 selecting one of the fuzzers 421-423 for execution by the fuzzing clients 311-313 during the first time interval.

At step 504, a feedback type is selected for statistics to be reported by the fuzzing clients at the end of the first time interval of the fuzzing test. This may include, for example, the agent 305 selecting one of the feedback types 431-433 for the fuzzing clients 311-313 to report at the end of the first time interval.

At step 506, an identification of the fuzzer and the feedback type is provided to each of the fuzzing clients. This may include, for example, the agent 305 providing an identification of the selected fuzzer 421-423 and the selected feedback type 431-433 to each of the fuzzing clients 311-313.

At step 508, statistics are obtained at the end of the first time interval of the fuzzing test. This may include, for example, the agent 305 obtaining the statistics at the end of the first time interval of the fuzzing test. The statistics are collected by the fuzzing clients 311-313 and are of the selected feedback type 431-433.

At step 510, one or more rewards are determined based on the statistics. This may include, for example, the agent 305 determining one or more rewards based on the statistics collected by the fuzzing clients 311-313 during the first time interval of the fuzzing test.

At step 512, multiple weights are adjusted in multiple stochastic policies using a policy gradient reinforcement learning algorithm based on the determined rewards. The weights are used to determine the fuzzer and the feedback type in a subsequent interval of the fuzzing test. This may include, for example, the agent 305 adjusting multiple weights associated with the fuzzers 421-423 and the feedback types 431-433 in the stochastic policies 411-412 based on the determined rewards.

At step 514, it is determined if the fuzzing test is to be performed during another time interval. This may include, for example, the agent 305 determining based on user input, a predetermined threshold number of time intervals, or any other suitable method. If so, the method 500 returns to step 502 and the operations are performed again in the new time interval. If not, the method 500 ends.

Although FIG. 5 illustrates one example of a method 500 for fuzzing test orchestration using reinforcement learning, various changes may be made to FIG. 5. For example, while shown as a series of steps, various steps in FIG. 5 may overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    selecting a fuzzer from among multiple fuzzers for execution by each of multiple fuzzing clients during a first time interval of a fuzzing test of computer software code;
    selecting a feedback type for statistics to be reported by the fuzzing clients at an end of the first time interval of the fuzzing test;
    providing an identification of the fuzzer and the feedback type to each of the fuzzing clients;
    obtaining the statistics at the end of the first time interval of the fuzzing test;
    determining one or more rewards based on the statistics; and
    adjusting multiple weights in multiple stochastic policies based on the one or more rewards, wherein the weights are used to select the fuzzer from among the multiple fuzzers and the feedback type in a subsequent interval of the fuzzing test.

2. The method of claim 1, wherein the multiple stochastic policies comprise:
    a first stochastic policy associated with the multiple fuzzers including the selected fuzzer; and
    a second stochastic policy associated with multiple feedback types including the selected feedback type.

3. The method of claim 2, wherein:
    each of the multiple fuzzers is associated with one of the multiple weights in the first stochastic policy; and
    each of the multiple feedback types is associated with one of the multiple weights in the second stochastic policy.

4. The method of claim 2, wherein:
    the fuzzer is selected based on a first fuzzer weight among the multiple weights in the first stochastic policy; and
    the feedback type is selected based on a first feedback type weight among the multiple weights in the second stochastic policy.

5. The method of claim 2, wherein the multiple fuzzers comprise two or more of a random data generator, a data mutator, and a generational fuzzer.

6. The method of claim 2, wherein the multiple feedback types comprise two or more of node coverage, edge coverage, branch taken/not taken coverage, number of tests executed, number of observed errors or exceptions during execution, and average length of a test.

7. The method of claim 1, further comprising:
    during the subsequent interval of the fuzzing test, selecting the fuzzer, selecting the feedback type, providing an identification of the fuzzer and the feedback type to each of the fuzzing clients, obtaining the statistics, determining the one or more rewards, and adjusting the multiple weights in the multiple stochastic policies again.

8. The method of claim 1, wherein the multiple weights are adjusted in the multiple stochastic policies using a policy gradient reinforcement learning algorithm.

9. A system comprising:
    at least one memory storing instructions; and
    at least one processor coupled to the at least one memory and configured when executing the instructions to:
        select a fuzzer from among multiple fuzzers for execution by each of multiple fuzzing clients during a first time interval of a fuzzing test of computer software code;
        select a feedback type for statistics to be reported by the fuzzing clients at an end of the first time interval of the fuzzing test;
        provide an identification of the fuzzer and the feedback type to each of the fuzzing clients;
        obtain the statistics at the end of the first time interval of the fuzzing test;
        determine one or more rewards based on the statistics; and
        adjust multiple weights in multiple stochastic policies based on the one or more rewards, wherein the weights are used to select the fuzzer from among the multiple fuzzers and the feedback type in a subsequent interval of the fuzzing test.

10. The system of claim 9, wherein the multiple stochastic policies comprise:
    a first stochastic policy associated with the multiple fuzzers including the selected fuzzer; and
    a second stochastic policy associated with multiple feedback types including the selected feedback type.

11. The system of claim 10, wherein:
    each of the multiple fuzzers is associated with one of the multiple weights in the first stochastic policy; and
    each of the multiple feedback types is associated with one of the multiple weights in the second stochastic policy.

12. The system of claim 10, wherein:
    the at least one processor is configured to select the fuzzer based on a first fuzzer weight among the multiple weights in the first stochastic policy; and
    the at least one processor is configured to select the feedback type based on a first feedback type weight among the multiple weights in the second stochastic policy.

13. The system of claim 10, wherein the multiple fuzzers comprise two or more of a random data generator, a data mutator, and a generational fuzzer.

14. The system of claim 10, wherein the multiple feedback types comprise two or more of node coverage, edge coverage, branch taken/not taken coverage, number of tests executed, number of observed errors or exceptions during execution, and average length of a test.

15. The system of claim 9, wherein the at least one processor is further configured to:
during the subsequent interval of the fuzzing test, select the fuzzer, select the feedback type, provide an identification of the fuzzer and the feedback type to each of the fuzzing clients, obtain the statistics, determine the one or more rewards, and adjust the multiple weights in the multiple stochastic policies again.

16. The system of claim 9, wherein the at least one processor is configured to adjust the multiple weights in the multiple stochastic policies using a policy gradient reinforcement learning algorithm.

17. A non-transitory computer readable medium containing instructions that when executed cause at least one processor to:
select a fuzzer from among multiple fuzzers for execution by each of multiple fuzzing clients during a first time interval of a fuzzing test of computer software code;
select a feedback type for statistics to be reported by the fuzzing clients at an end of the first time interval of the fuzzing test;
provide an identification of the fuzzer and the feedback type to each of the fuzzing clients;
obtain the statistics at the end of the first time interval of the fuzzing test;
determine one or more rewards based on the statistics; and
adjust multiple weights in multiple stochastic policies based on the one or more rewards, wherein the weights are used to select the fuzzer from among the multiple fuzzers and the feedback type in a subsequent interval of the fuzzing test.

18. The non-transitory computer readable medium of claim 17, wherein the multiple stochastic policies comprise:
a first stochastic policy associated with the multiple fuzzers including the selected fuzzer; and
a second stochastic policy associated with multiple feedback types including the selected feedback type.

19. The non-transitory computer readable medium of claim 18, wherein:
each of the multiple fuzzers is associated with one of the multiple weights in the first stochastic policy; and
each of the multiple feedback types is associated with one of the multiple weights in the second stochastic policy.

20. The non-transitory computer readable medium of claim 18, wherein:
the fuzzer is selected based on a first fuzzer weight among the multiple weights in the first stochastic policy; and
the feedback type is selected based on a first feedback type weight among the multiple weights in the second stochastic policy.

* * * * *